April 23, 1946.  B. F. RANDRUP  2,398,962
ADJUSTABLE CLAMP
Filed March 21, 1944
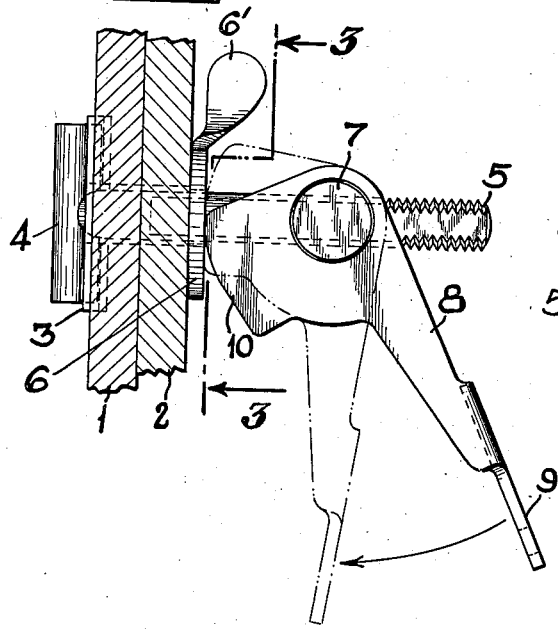
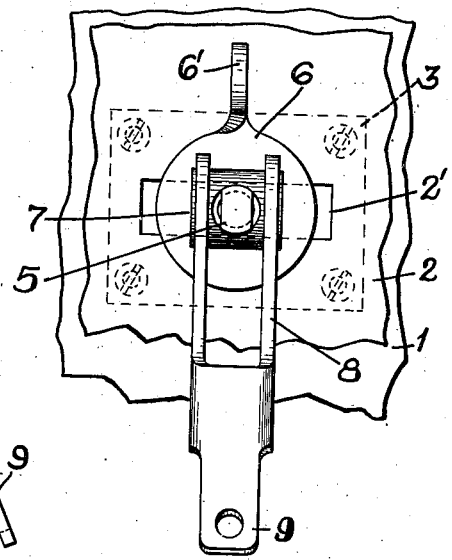
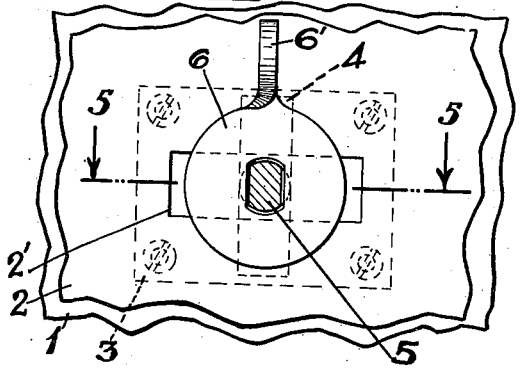
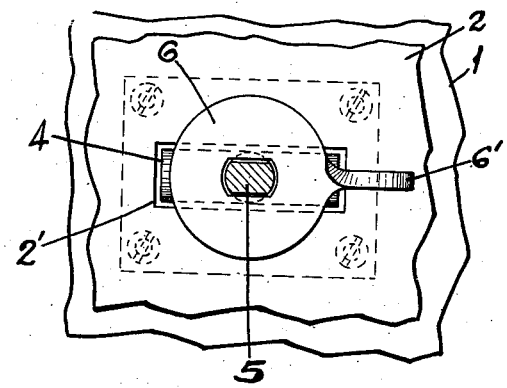
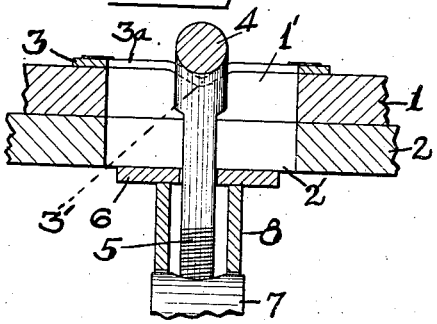
INVENTOR
Benjamin F. Randrup
BY J. E. Trabucco
ATTORNEY.

Patented Apr. 23, 1946

2,398,962

UNITED STATES PATENT OFFICE 2,398,962

ADJUSTABLE CLAMP

Benjamin F. Randrup, Brisbane, Calif.

Application March 21, 1944, Serial No. 527,503

2 Claims. (Cl. 85—3)

This invention relates to an improved adjustable clamp.

An object of my invention is to provide an adjustable clamp embodying a novel construction having clamping elements capable of being readily adjusted with respect to each other in a manner which permits their use with members of different thicknesses.

Another object of my invention is to provide an improved adjustable clamp embodying two clamping elements which are capable of being adjustably positioned either closer to or farther from each other, depending upon the thickness of the members to be clamped together, and means arranged to readily move clamping elements after their adjustment into firm clamping engagement with respect to the said members.

Other and further objects of my invention will be pointed out hereinafter or will be indicated in the appended claims, or will be obvious to one skilled in the art upon an understanding of the present disclosure. For the purpose of this application I have elected to show herein certain details of an adjustable clamp representative of my invention; it is to be understood, however, that the embodiment of my invention herein shown and described is for the purpose of illustration only, and that therefore it is not to be regarded as exhaustive of the variations of the invention, nor is it to be given an interpretation such as might have the effect of limiting the claims short of the true and most comprehensive scope of the invention in the art.

In the accompanying drawing:

Fig. 1 is a side elevation of an adjustable clamp embodying my invention;

Fig. 2 is an end view of the same;

Fig. 3 is a sectional view taken on the line 3—3 of Fig. 1;

Fig. 4 is a similar view showing the position of one of the clamping elements at an angle of ninety degrees with respect to its position in Fig. 3; and Fig. 5 is a sectional view taken on the line 5—5 of Fig. 3.

Referring to the drawing, the numerals 1 and 2 designate two members which are to be held in clamped relationship by my improved clamp. The two members are provided with slots 1' and 2' through which one of the clamping elements may be passed, as will be later described.

At the rear side of the member 1 is secured, as by screws or other suitable means, a plate 3 having a transverse groove 3' and a slot 3a which is preferably positioned at an angle of ninety degrees with respect to the groove. The slot 3a is substantially the same width and length as the slots 1' and 2' and its position coincides with the latter.

Normally positioned in the transverse groove 3' of the plate 3 is a clamping element 4 which preferably, but not necessarily, assumes the shape of a bar adapted to be passed through the slots 1', 2' and 3a. Centrally secured to the clamping element 4 and positioned substantially at right angles thereto is a threaded rod or member 5 which is preferably flattened or otherwise irregularly formed at one or both of its opposite sides to provide means which, when engaged by a bearing or clamping plate 6 having a similarly shaped opening, will facilitate the turning of the said rod and the clamping element 4 carried thereby. The bearing plate 6 is normally positioned against the member 2 and it has a finger piece 6' which facilitates the turning thereof to cause the clamping element 4 to be adjusted so the latter becomes lodged in the groove 3' of the plate 3 after being passed through the slots 1', 2' and 3a.

Screwed on the threaded rod 5 is a cylindrically shaped nut 7 upon which, and at opposite sides of the threaded rod 5, is rotatably mounted a bifurcated lever 8 having a handle 9 at one end and a cam member 10 formed at its opposite end. The lever 8, when turned about the rod 5 in a clockwise direction, will rotate the nut 7 so as to cause it to move toward the bearing plate 6. In practice the nut is thus adjusted to such a position with respect to the bearing plate 6 that the particular part of the lever 8 which is located directly adjacent the cam member 10, is in firm engagement with the said plate, as shown in Fig. 1. Such an adjustment will actuate the clamping element 4 and the bearing plate 6 toward each other and thereby cause their engagement with the members 1 and 2, respectively. The subsequent pivotal movement of the lever 8 on the cylindrical nut 7, brought about by pushing the lower part or handle of the said lever inwardly as indicated by the arrow and the broken lines in Fig. 1, will cause the cam 10 of the said lever to firmly engage with the bearing plate 6 and urge the same inwardly while at the same time the nut, the rod 5 and the clamping element 4 will be urged in the opposite direction. Such a manipulation of the device will bring about the firm clamping of the members 1 and 2 between the bearing plate 6 and the clamping element 4. The nut 7, being adjustably mounted on the rod 5, provides suitable means for supporting the lever 8 at different distances with respect to the clamping element 4, thereby permitting the device to be satisfactorily used as a clamp to hold members having different over all thicknesses in clamped positions.

What I claim is:

1. In an adjustable clamping element, a rod secured to the clamping element, a bearing plate adjustably mounted on the rod and having means for turning the rod and the clamping element about an axis, a lever mounted on the rod and arranged for adjustment toward and away from the clamping element, and a cam carried by the lever and arranged to be actuated by the lever against the bearing plate, whereby the bearing plate is urged toward the clamping element.

2. In an adjustable clamp, a grooved plate engageable with one of a number of members to be clamped together and having a hole therein, a bearing plate engaging with another of the said members and having a hole of certain irregular shape therein, a clamping member normally positioned in the groove of the plate, a threaded rod secured to the clamping element and normally extending through the members and the plates, the said rod having a cross sectional shape fitting the hole in the bearing plate, means on the bearing plate for turning the same, whereby the rod may be turned to engage or disengage the clamping member with respect to the groove in the grooved plate, a nut adjustably mounted on the rod, a lever pivotally carried by the nut having a cam member for engaging with the bearing plate, whereby when the lever is actuated in a certain direction the cam member will urge the bearing plate toward the clamping element.

BENJAMIN F. RANDRUP.